United States Patent [19]

Irish

[11] Patent Number: 5,615,584
[45] Date of Patent: Apr. 1, 1997

[54] SLIDE N' SNAP WITH LIVING HINGE LOCK

[75] Inventor: Allen G. Irish, Flint, Mich.

[73] Assignee: Teleflex Incorporated, Plymouth Meeting, Pa.

[21] Appl. No.: 560,800

[22] Filed: Nov. 21, 1995

[51] Int. Cl.⁶ .................................................... F16C 1/26
[52] U.S. Cl. ........................ 74/502.6; 248/56; 248/27.3
[58] Field of Search ................ 74/502.4, 502.6; 248/56, 27.3, 27.1, 73, 71, 74.2; 24/136 L, 115 M, 134 L, 132 WL

[56] References Cited

U.S. PATENT DOCUMENTS 4,763,541 8/1988 Spease.
5,272,934 12/1993 Chegash et al..

Primary Examiner—Charles A. Marmor
Assistant Examiner—Saul J. Rodriguez
Attorney, Agent, or Firm—Howard & Howard

[57] ABSTRACT

A motion transmitting remote control assembly (10) of the type for transmitting forces along a curved path by a motion transmitting core element (12) movably supported by a conduit (18) with a fitting (20) supporting the assembly in a U-shaped seat (14) in a bulkhead (16). A pair of flanges (22 and 24) position the fitting (20) in the U-shaped seat (14) and an L-shaped arm (30) is alligned with one of the flanges (22) for disposing a locking projection (32) in a hole (34) in the bulkhead (16) to prevent the fitting (20) from moving out of the U-shaped seat (14). The assembly is characterized by a lock tab (38) hingedly supported on the fitting (20) for movement between an unlocked position, to allow movement of the L-shaped arm (30) to the deflected position, and a locked position, to prevent the L-shaped arm (30) from moving out of gripping engagement with the bulkhead (16).

10 Claims, 2 Drawing Sheets

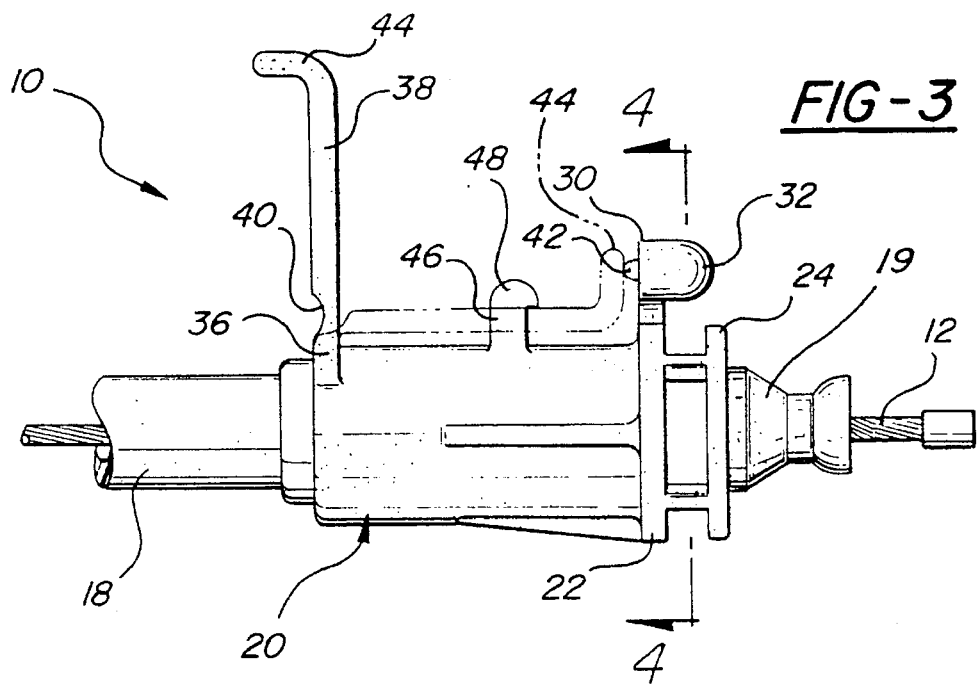
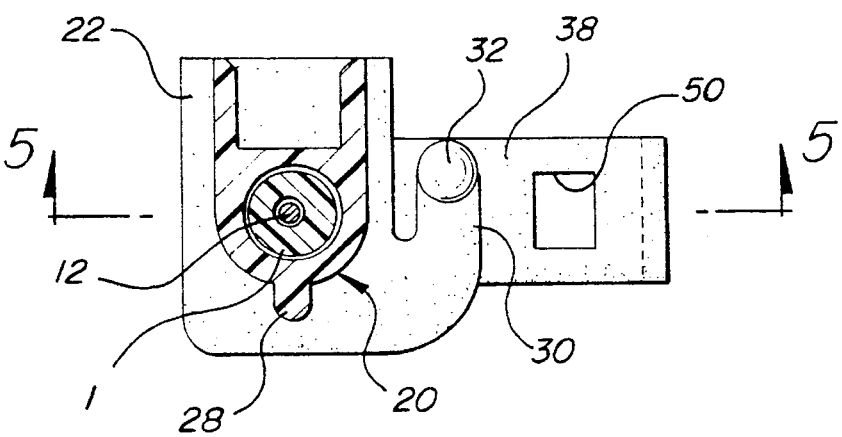
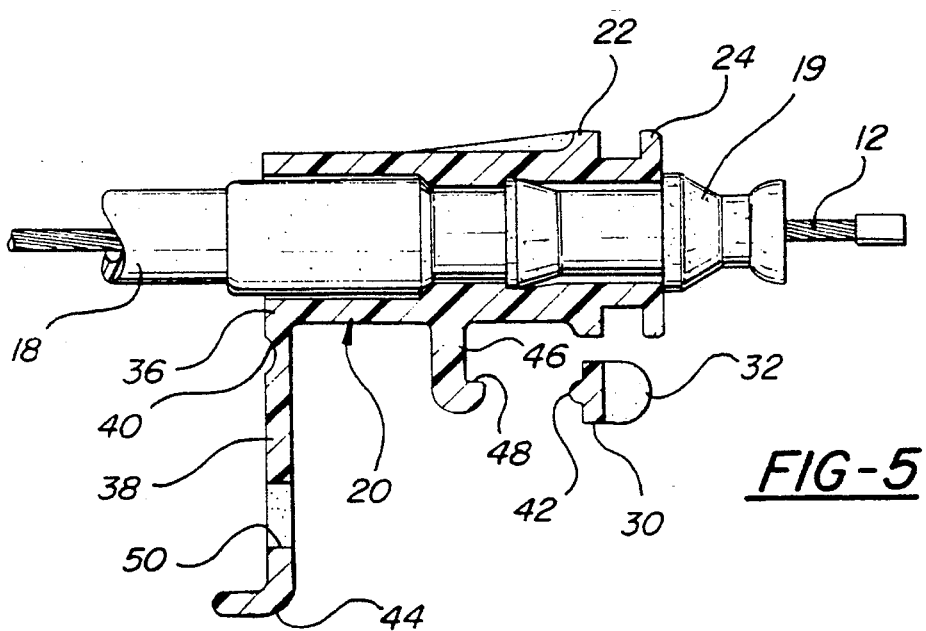

5,615,584

1

SLIDE N' SNAP WITH LIVING HINGE LOCK

TECHNICAL FIELD

The subject invention relates to a motion transmitting remote control assembly of the type for transmitting motion in a curved path by a flexible motion transmitting core element movably supported in a guide such as a conduit. More specifically, the invention relates to a guide including an end fitting and a conduit wherein the end fitting is retained in a U-shaped seat in a bulkhead.

BACKGROUND ART

Prior art remote control assemblies have included a conduit supported in a U-shaped seat in a bulkhead by a ferrule or support fitting. Such a fitting have also included an extension or L-shaped arm with a projection at the distal end for snapping into a hole in the bulkhead to retain the fitting in the U-shaped seat. Such an assembly is disclosed in U.S. Pat. No. 4,763,541 to Spease and assigned to the assignee of the subject invention. An improvement, also assigned to the assignee hereof, is disclosed in U.S. Pat. No. 5,272,934 to Chegash et al, wherein there is a back stop to limit the flexing movement of the L-shaped arm thereby preventing excess bending and/or breaking of the L-shaped arm. In some environments, however, the L-arm undesirably flexes out of engagement with the hole in the bulkhead, allowing removal of the fitting from the U-shaped seat. In yet other assemblies, a separate lock or a lock tethered to the assembly are utilized but are susceptible to inadvertent detachment and loss during shipping.

SUMMARY OF THE INVENTION

A motion transmitting remote control assembly of the type for transmitting forces along a curved path by a motion transmitting core element movably supported by a guide means having first and second ends and a bore therethrough defining a first axis for extending through and supported in a substantially the U-shaped seat in a bulkhead. An abutment means positions the guide means in the U-shaped seat and a gripping means is disposed laterally from the abutment means and from the guide means for gripping engagement with the bulkhead to prevent the guide means from moving out of the U-shaped seat, the gripping means being movable to a deflected position out of gripping engagement with the bulkhead for installation of the abutment means into the U-shaped seat. The assembly is characterized by a lock hingedly supported on the guide means for movement between an unlocked position to allow movement of the gripping means to the deflected position, and a locked position to prevent the gripping means from moving out of gripping engagement with the bulkhead.

BRIEF DESCRIPTION OF THE DRAWINGS

Other advantages of the present invention will be readily appreciated as the same becomes better understood by reference to the following detailed description when considered in connection with the accompanying drawings wherein.

2

Figure 1:
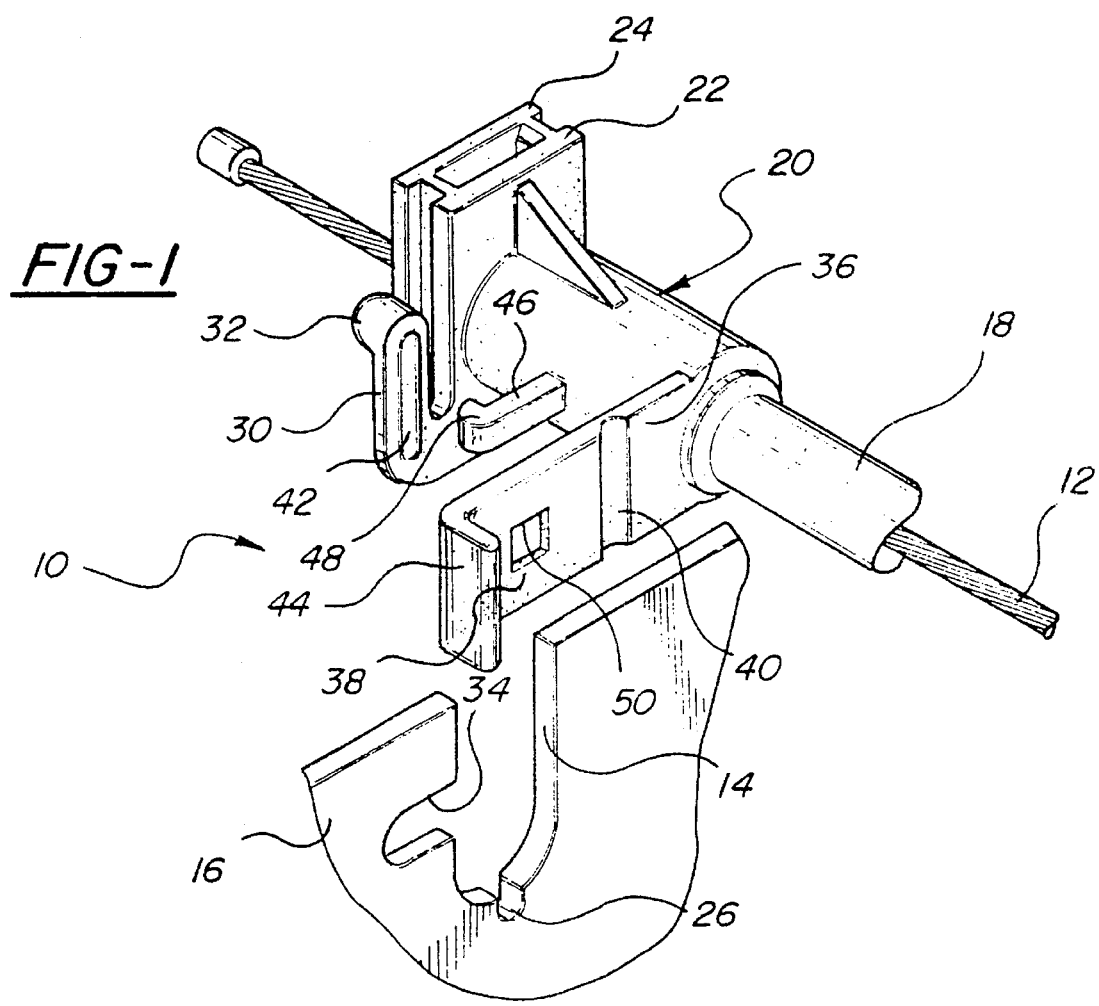
FIG. 1 is a fragmentary exploded perspective view of a preferred embodiment.

FIG. 3 is a top view showing the assembly in the pre-installed position and the fully installed position in phantom;

FIG. 4 is a cross-sectional view taken substantially along line 4—4 of FIG. 3; and FIG. 5 is a cross-sectional view taken substantially along line 5—5 of FIG. 4.

DETAILED DESCRIPTION OF THE PREFERRED EMBODIMENT

Referring to the Figures, wherein like numerals reference like or corresponding parts throughout the several views, a motion transmitting remote control assembly is generally shown at 10. The motion transmitting remote control assembly 10 is of the type for transmitting forces along a curved path by a motion transmitting core element 12 and being supported in a U-shaped seat 14 in a bulkhead 16.

The assembly 10 comprises a guide means having first and second ends and a bore therethrough defining a first axis for extending through the substantially the U-shaped seat 16. A conduit 18 and a fitting, generally indicated at 20, comprise the guide means having first and second ends and a bore therethrough defining a first axis for extending through the U-shaped seat 14. The core element 12 is slidably supported in the bore in the guide means for transmitting motion between the ends of the guide means. The core element 12 is movably supported in the conduit 18, the conduit 18 being of the type well known in the art comprising an inner tubular plastic member surrounded by long lay wires and an outer extruded plastic casing. The fitting 20 is of rigid plastic or organic polymeric material and is disposed on the conduit 14 for being supported in the U-shaped seat 14 in the bulkhead or wall 16.

An abutment means positions the guide means in the U-shaped seat 14. The abutment means includes inner 22 and outer 24 spaced flanges for abutting engagement with the edges of the bulkhead 16 therebetween to prevent axial movement of the guide means relative to the bulkhead 16. The saddle between the flanges 22 and 24 is semi-circular to engage, in a complementary fashion, the semi-circular bottom of the seat 14. The u-shaped seat 14 includes a notch 26 at the bottom thereof and a guide rib 28 is disposed between the flanges 22 and 24 to enter the notch 26 in the fully installed position. In other words, the rib 28 guides the fitting 20 into the proper seated position in the seat 14.

A gripping means is disposed laterally from the flanges 22 and 24 of the abutment means and from the guide means for gripping engagement with the bulkhead 16 to prevent the guide means from moving out of the U-shaped seat 14. The gripping means includes an extension in the form of an L-shaped arm 30 extending laterally from and generally co-planar with the inner flange 22. The L-shaped arm extends laterally and then parallel and spaced from the inner flange 22 to a distal end. The gripping means also includes a projection 32 extending axially from the distal end of the L-shaped arm 30 for disposition in a hole or recess 34 in the bulkhead 16. The gripping means is movable to a deflected position with the projection 32 out of gripping engagement with the hole 34 in the bulkhead 16 during installation of the abutment means into the U-shaped seat 14.

Figure 2:
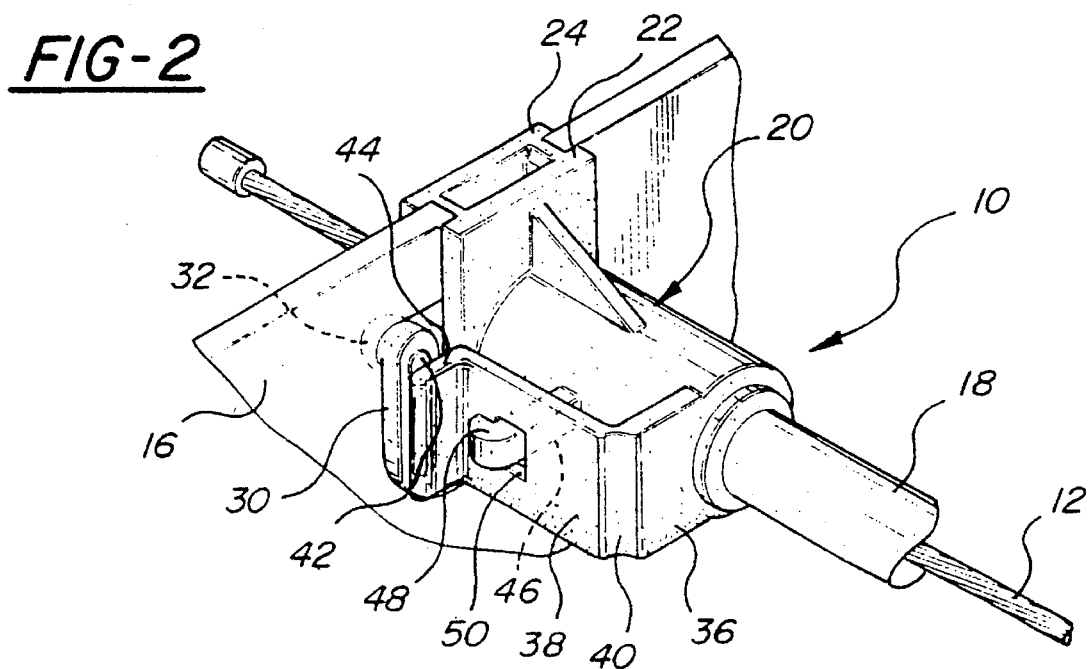
FIG. 2 is a fragmentary perspective view showing the assembly in the fully installed position.

The assembly 10 is characterized by a lock hingedly supported on the fitting 20 of the guide means for movement between an unlocked position as shown in FIG. 1, to allow movement of the L-shaped arm 30 of the gripping means to the deflected position, and a locked position as shown in FIG. 2, to prevent the L-shaped arm 30 of the gripping means from moving out of gripping engagement with the hole 34 in the bulkhead 16. More specifically, the lock includes a hinge flange 36 extending latterly at a position axially spaced from and radially aligned with the L-shaped arm 30 of the gripping means and a swinging tab 38 connected to the hinge flange 36 by a living hinge 40 integral with both of the hinge flange 36 and the tab 38 for swinging movement into engagement with the back of the L-shaped arm 30 of the gripping means in the locked position. The living hinge 40 is defined by a groove between the hinge flange 36 and the tab 38, the living hinge groove being disposed in the side of the hinge flange 36 facing away from the L-shaped arm 30.

The assembly 10 includes a detent ridge 42 for releasably holding the tab 38 of the lock in the locked position. The ridge 42 is disposded on the back of the L-shaped arm 30 and the tab 38 has a rounded end 44 for ramping over the ridge 42 and to be snapped behind and retained by the ridge 42.

The assembly 10 further includes a catch 46 for holding the lock tab 38 in the locked position. The catch 46 comprises an post extending radially from the fitting at a position spaced approximately halfway between the L-shaped arm 30 and the hinge flange 36. The tab 38 includes a hole 50 therethrough and the catch 46 includes a hook 48 at the distal end of the post for extending through the hole 50 in the tab 38 and snapping into locked engagement therewith to retain the tab 38 in the locked position.

During shippment and just prior to installation the assembly is as shown in FIG. 1. As the fitting 20 is moved into the U-shaped seat 14 in the bulkhead 16, the edges of the slot 14 slide between the flanges 22 and 24 and the rib 28 enters the notch 26. During this movement, the projection 32 ramps up and over the bulkhead 16 as the L-shaped arm 30 flexes. When the projection 32 reaches the hole 34, the arm 30 snaps back and the projection drops into the hole 34, thus preventing the removal from the bulkhead under normal conditions. However, to positively prevent or lock the assembly to the bulkhead, the tab 38 is hinged to force the rounded end 44 over the ridge 42. At the same time, the hook 48 is forced through the hole 50 as the post 36 flexes and snaps back to overlap the hook 48 with the tab 38. Accordingly, the tab 38 engages the back of the L-shaped arm 30 to prevent the arm 30 from flexes out of locked engagement with the bulkhead 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) comprising:

guide means having first and second ends and a bore therethrough defining a first axis;

a core element (12) movably supported in said bore in said guide means for transmitting motion between said ends of said guide means;

abutment means for positioning said guide means in a U-shaped seat (14) in a bulkhead (16);

gripping means disposed laterally from said abutment means and from said guide means for gripping engagement with the bulkhead (16) to prevent said guide means from moving out of the U-shaped seat (14), said gripping means movable to a deflected position out of said gripping engagement; and characterized by a lock hingedly supported on said guide means for movement between an unlocked position, to allow movement of said gripping means to said deflected position, and a locked position, to prevent said gripping means from moving out of said gripping engagement;

a hinge flange (36) extending latterly at a position axially spaced from said gripping means and a tab (38) connected to said hinge flange (36) by a living hinge integral with both of said hinge flange (36) and said tab (38) for swinging movement into engagement with said gripping means in said locked position; a post (46) extending radially from said fitting (20) at a position spaced between said gripping means and said hinge flange (36), said tab (38) including a hole (50) therethrough, a hook (48) at the distal end of said post (46) for extending through said hole (50) in said tab (38) and snapping into locked engagement therewith to retain said tab (38) in said locked position.

2. An assembly (10) as set forth in claim 1 wherein said abutment includes inner (22) and outer (24) spaced flanges for abutting engagement with the bulkhead (16) therebetween to prevent axial movement of said guide means relative to the bulkhead (16), and said gripping means includes an extension (30) extending laterally from and generally co-planar with said inner flange (22).

3. An assembly (10) as set forth in claim 2 including a detent (42) for releasably holding said lock in said locked position.

4. An assembly (10) as set forth in claim 2 wherein said gripping means includes a projection (32) extending axially from said extension (30) for disposition in a hole (34) in the bulkhead (16).

5. An assembly (10) as set forth in claim 4 wherein said extension comprises an L-shaped arm (30) extending laterally and then parallel and spaced from said inner flange (22) to a distal end, said gripping projection (32) being disposed on said distal end.

6. An assembly (10) as set forth in 5 wherein said guide means includes a conduit (18) supporting said core element (12), and a fitting (20) of organic polymeric material disposed about said conduit (18).

7. An assembly (10) as set forth in claim 1 including a detent (42) for releasably holding said lock in said locked position.

8. An assembly (10) as set forth in claim 7 wherein said detent (42) comprises a ridge on the back of said L-shaped arm (30), said tab (38) having a rounded end (44) for abutting said ridge (42).

9. An assembly (10) as set forth in claim 8 wherein said living hinge is defined by a groove (40) between said hinge flange (36) and said tab (38).

10. An assembly (10) as set forth in claim 9 wherein said groove (40) is disposed in the side of said hinge flange (36) facing away from said L-shaped arm (30).

* * * * *